United States Patent
Zerato et al.

Patent Number: 5,349,925
Date of Patent: Sep. 27, 1994

[54] ANIMAL FEEDER DEVICE

[76] Inventors: Louis Zerato, P.O. Box 872, Yellville, Ark. 72687; Art Randolph, P.O. Box 1541, Santa Rosa, Calif. 95402

[21] Appl. No.: 131,442

[22] Filed: Oct. 4, 1993

[51] Int. Cl.⁵ ............................................. A01K 5/00
[52] U.S. Cl. ..................................................... 119/62
[58] Field of Search ........................... 119/62, 63, 76; 220/263, 262, 331, 332, 333

[56] References Cited

U.S. PATENT DOCUMENTS

| | | | |
|---|---|---|---|
| 693,258 | 2/1902 | Gibson | 220/263 |
| 1,324,667 | 12/1919 | Hanson | 220/263 |
| 2,195,033 | 3/1940 | Lehman | 220/263 |
| 2,348,349 | 5/1944 | Lumley | 220/263 |
| 2,349,283 | 5/1944 | King et al. | 220/263 X |
| 4,572,108 | 2/1986 | Daifotes | 119/62 X |

*Primary Examiner*—Thomas Price
*Attorney, Agent, or Firm*—Malcolm B. Wittenberg

[57] ABSTRACT

A feeder for the selective presentation of food products for animals. The feeder includes a storage bin for containing animal food which includes an open top and a lid. A pressure plate is provided which is functionally linked to the open top. When an animal steps upon the pressure plate, the lid opens revealing the interior of the bin and its housed food products in a manner which is calculated not to frighten the animal being fed.

3 Claims, 2 Drawing Sheets

ANIMAL FEEDER DEVICE

TECHNICAL FIELD OF THE INVENTION

The present invention deals with feeders for animals which are constructed in such a way that the food is contained in a closed container or bin until an animal actuates a pressure plate exposing the food. Devices of this nature are employed to prevent unwanted animals from consuming animal feed products while minimizing insect and environmental exposure to such food products.

BACKGROUND OF THE INVENTION

There are many ways to provide food products to both domestic (pet) and farm animals. When dealing with situations where the animal is tempted to consume all of its food in one relatively short time interval, the task is an easy one. In this instance, food and water is simply presented to the animal, consumption takes place and the feed container removed for later use.

There are, however, instances where food must be made available to an animal to enable it to feed at will. Such situations include instances where animals are encouraged to increase weight such as when animals are intended for slaughter for later human consumption. Also, there are situations where an animal must be left unattended for long periods of time. As a result, there is a need to provide food to the animal on a demand basis knowing that the presented food supply is of a quantity which the animal could not possibly consume at a single feeding.

On demand feeding presents certain practical problems which are of a major concern. For example, if the food was to be left exposed for even relatively short periods of time, spoilage could be accelerated by exposure to direct sunlight. In addition, insects bearing various diseases would, in all likelihood, be attracted to the food product which may result in transmission of various diseases to the animal itself. Furthermore, the food product may attract unwanted animals who may look upon the food supply as their own. Aggressive non-domesticated animals may become so insistent in pursuing the seeming readily available food supply that they may either singly or in packs not only consume the food to the exclusion of the intended animal to be fed but may also intimidate a domestic animal preventing it from approaching its food on an as-needed basis.

There have been a wide variety of animal feeders which have attempted to address the above-recited concerns. However, such devices have often proven to be so inadequate or complex that the average domestic or farm animal is incapable of actuating the device to provide for food presentation on a selective basis. Other products have proven to be unreliable and still further products tend to frighten timid animals when employed such that the animal would rather starve than to approach and actuate the appropriate mechanism for providing for the presentation of its food supply.

It is thus an object of the present invention to provide a feeder for the selective presentation of food products to animals which overcomes the shortcomings recited above.

It is yet a further object of the present invention to provide a feeder for the selective presentation of food products to animals which is simple in construction and unlikely to present a complex, unreliable or intimidating presentation to an animal seeking food.

These and further objects will be more readily appreciated considering the following disclosure and appended drawings wherein:

FIG. 1 provides an isometric perspective view of the animal feeder of the present invention in an open condition; and FIG. 2 represents a side plan view of the animal feeder of the present invention showing its various component parts during actuation.

SUMMARY OF THE INVENTION

The present invention deals with a feeder for the selective presentation of food products to animals. The feeder comprises a storage bin for containing animal food having a closed bottom and side walls and an open top. A lid having a forward edge and a rearward edge is situated such as to removably reside over the open top making food products unavailable for consumption.

A pressure plate is located adjacent the closed bottom of the bin which emanates from the bin on a side proximate the location of the forward edge of the lid when the lid is positioned over the top. Means are provided for functionally linking the pressure plate to the lid such that when an animal steps upon the pressure plate, the lid withdraws from the top. Withdrawal of the lid is carried out whereby the forward edge of the lid does not vertically rise above the rearward edge of the lid in exposing food products within the bin to the animal. In this way, the animal is not frightened when it steps upon the pressure plate seeking food within the bin.

DETAILED DESCRIPTION OF THE INVENTION

Figure 1:
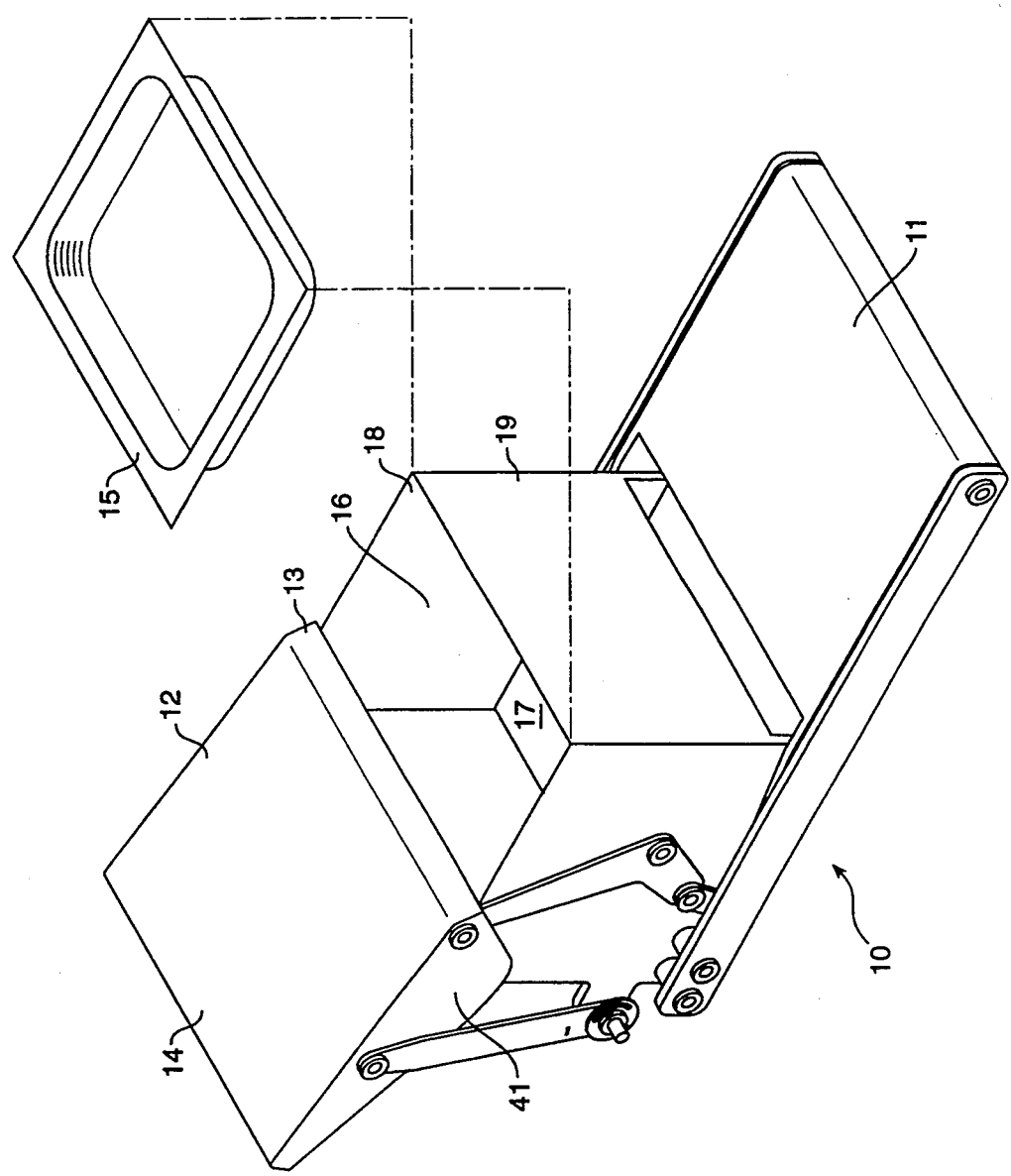

Turning to FIG. 1, feeder 10 is provided for the selective presentation of food products to animals. The feeder comprises storage bin 16 for containing animal food either directly or through the use of removable tray 15. The tray can be partitioned into various segments for including solid and liquid food or water in a segregated fashion.

The storage bin is provided with a closed bottom 17 and sidewalls 19 which are generally of a vertical orientation resulting in a box-like structure having an open top 18.

Lid 12 is provided having a forward edge 13, rearward edge 14 and side flaps 41. As shown, lid 12 removably resides over open top 18 such that when lid 12 resides on the open top, food products are unavailable for consumption by animals. Forward and rearward edges 13 and 14 form lips which overlap sidewalls 19 enabling lid 12 to cover open top 18 even when feeder 10 is situated upon an uneven surface or when the weight of an animal might tend to twist the feeder and misalign the lid.

Pressure plate 11 is located adjacent to closed bottom 17 of bin 16. As shown, pressure plate 11 emanates from bin 16 on a side proximate the location of the forward edge 13 of lid 12 when the lid is positioned over open top 18. Means are provided for functionally linking the pressure plate to the lid such that when an animal steps upon the pressure plate in the direction of arrow 20 (FIG. 2), the lid withdraws from the top as shown by directional arrow 29.

Lid 12 is supported by sidewalls 19 of bin 16 at forward edge 13 by pivotal support arm 22 at pivotal grommet 27. Lid 12 is further supported at its approximate midpoint by rear supporting arms 23 at pivotal grommet 28.

Pressure plate 11 is caused to pivot over grommet 21 when pressure is applied at the direction of arrow 20. The distal end of pressure plate 11 provides a second pivot point at grommet 26 which in turn is connected to linkage arm 4 and pivotal grommet 25. This linkage pivotally connects pressure plate 11 to support arms 22. As such, support arm 22 pivots over grommet 34 assuming a position shown in phantom in FIG. 2. Ideally, support arms 22 extends within flaps 41 while support arms 23 resides outside of flaps 41. This configuration coupled with the limitation that, as a preferred embodiment flaps 41 never extends above side walls 19, results in a device wherein top 12 can never misalign from storage bin 16 - even when a heavy animal stands off center on the pressure plate.

Simultaneously, rear support arm 23 moves in a clockwise direction while pivoting over grommet 28. Support arm 23 moves in a clockwise orientation across pivot 33 to assume the position shown in phantom in FIG. 2.

The various linkage elements recited above provide a key characteristic of the present invention. That is, lid 12 in progressing from a closed to an open orientation does so whereby forward edge 13 of lid 12 does not vertically rise above rearward edge 14 of lid 12 in exposing food products within bin 16 to the animal. As such, the lid does not "flip up" which is a motion which would be startling to an animal and may be so frightening and traumatic that the animal would simply starve rather than to risk confrontation with such a device. Further the present linkage system provides a slight downward slope to lid 12 and forward lip 13 which acts as a rain lid. The linkage system lends itself to easy economical manufacture by the use of injection molding of strong plastic components for most of the parts used herein.

Figure 2:
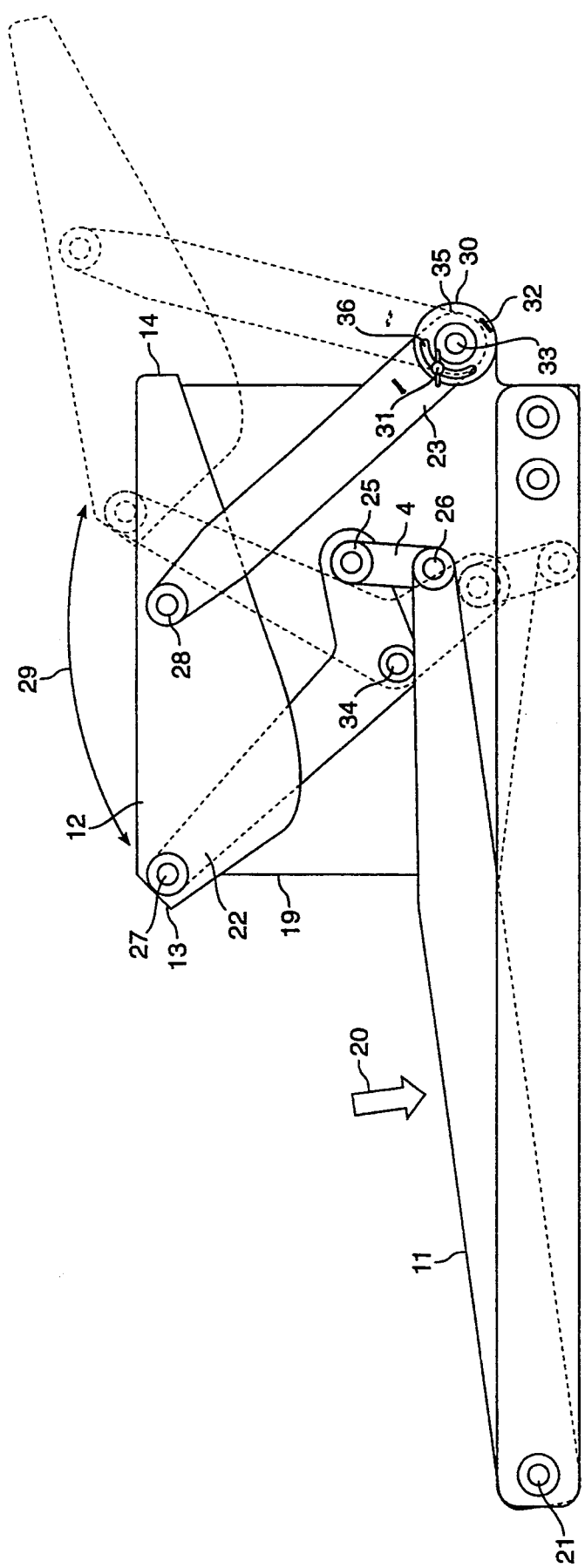

It is further noted, particularly in reference to FIG. 2, that as lid 12 opens in response to pressure being applied to pressure plate 11 in the direction of arrow 20 that lid 12 not only moves upwardly in the manner described above, but also rearwardly and away from the location of an animal standing upon pressure plate 11. Such a movement would again be least likely to frighten an animal causing an animal to lurch from pressure plate 11 thus causing lid 12 to close.

It is further contemplated that support arm 23 and, in turn, lid 12, be biased by spring assembly 30 whereby lid 12 remains covering open top 18 of bin 16 unless an animal of sufficient weight to overcome the bias steps on the pressure plate. As such, when the animal is not feeding, residual food products contained within bin 16 remain unexposed to the elements and unavailable to insects.

As yet a further embodiment of the present invention, it is contemplated that spring means 30 be adjustable. There are many ways in which to provide adjustability of spring means 30. One such embodiment would include slip washer 35 which is provided with support 32 for accepting one end of a suitable spring and adjustable slip connector 31. In practice, as the slip connector passes within open channel 36, it can be tightened anywhere along the channel thus increasing or decreasing the compression of the spring resulting in a variance in the biasing force asserted upon rear connector arm 23 and lid 12. As such, for example, when one is attempting to feed a fifty pound dog, spring means 30 can be adjusted to prevent light animals such as squirrels, chipmunks and the like from opening lid 12 exposing food within bin 16 by standing upon pressure plate 11.

We claim:

1. A feeder for the selective presentation of food products to animals, said feeder comprising a storage bin for containing animal food, said storage bin having a closed bottom and side walls and an open top, a lid, said lid having a forward edge and rearward edge removably residing over said open top such that when said lid resides on said open top, said food products are covered by said lid, a pressure plate located adjacent said closed bottom of said bin and emanating from said bin on a side proximate the location of the forward edge of said lid when said lid is positioned over said top, and means for functionally linking said pressure plate to said lid such that when an animal steps upon said pressure plate, said lid withdraws from said top in an orientation that the forward edge of the lid does not vertically rise above said rearward edge of the lid in exposing food products within the bin to said animal wherein said lid is spring biased whereby the lid remains covering said open top of said bin unless an animal of sufficient weight overcomes said bias and steps upon said pressure plate.

2. The feeder of claim 1 wherein said spring bias is adjustable enabling said lid to be removed from said open top of said bin only by the application of sufficient force being exerted upon said pressure plate while preventing said removal of said lid from said open top if the pressure being applied to said pressure plate is insufficient to overcome the adjusted bias of said spring.

3. A feeder for the selective presentation of food products to animals, said feeder comprising a storage bin for containing animal food, said storage bin having a closed bottom and side walls and an open top, a lid, said lid having a forward edge and rearward edge removably residing over said open top such that when said lid resides on said open top said food products are covered by said lid, a pressure plate located adjacent said closed bottom of said bin and emanating from said bin on a side proximate the location of the forward edge of said lid when said lid is positioned over said top, and means for functionally linking said pressure plate to said lid such that when an animal steps upon said pressure plate, said lid withdraws from said top in an orientation whereby the forward edge of the lid does not vertically rise above said rearward edge of the lid in exposing food products within the bin to said animal wherein said lid is provided with vertically extending flaps whereby said lid is limited in being removed from said top of said bin upon force being exerted upon said pressure plate such that said flaps do not extend above said storage bin sidewalls.

* * * * *